Nov. 1, 1955
J. E. RODE
2,722,167
PLANT THINNING APPARATUS
Filed Nov. 12, 1952
5 Sheets-Sheet 2
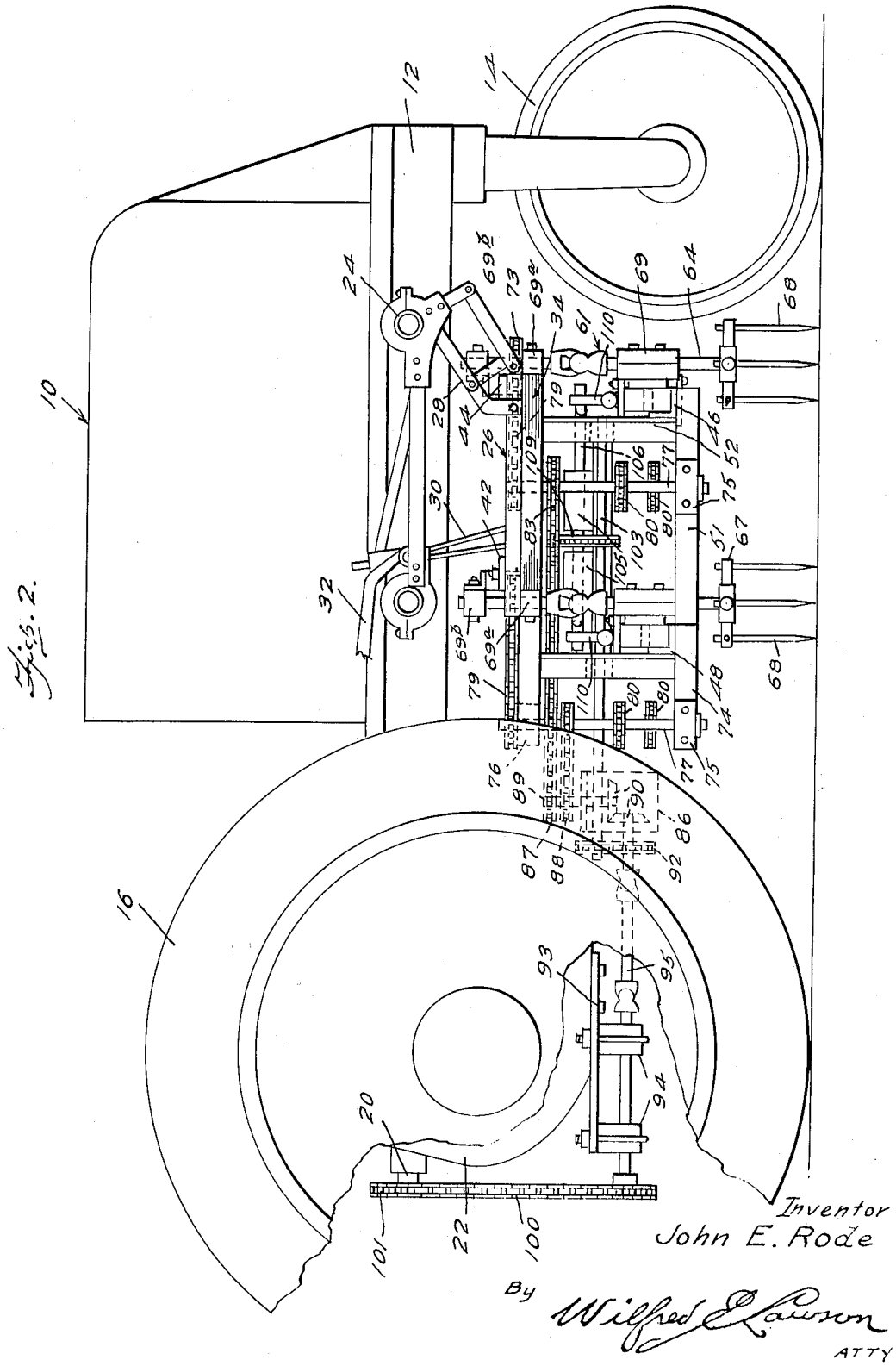
Inventor
John E. Rode
By Wilfred E. Lawson
ATTY

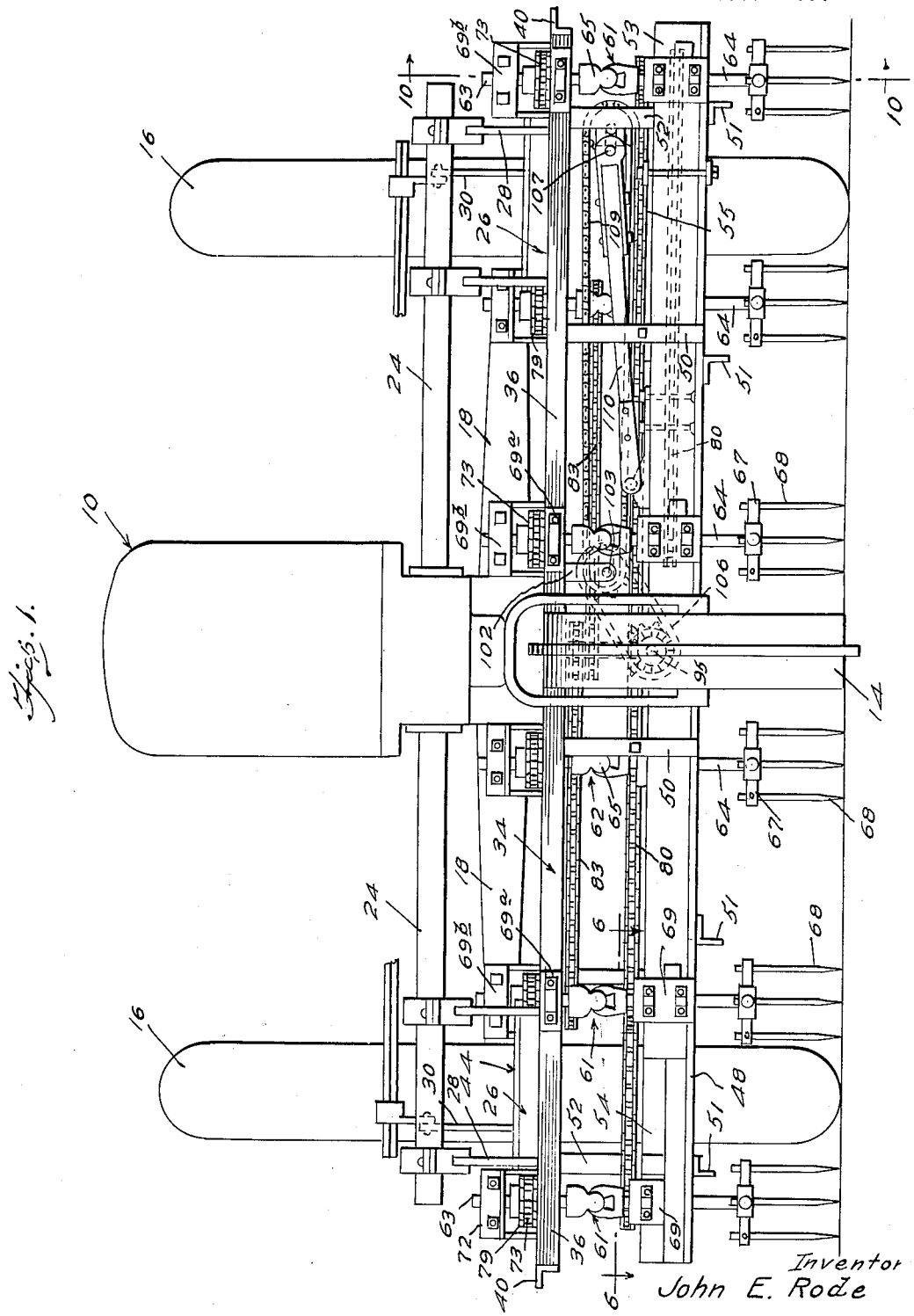

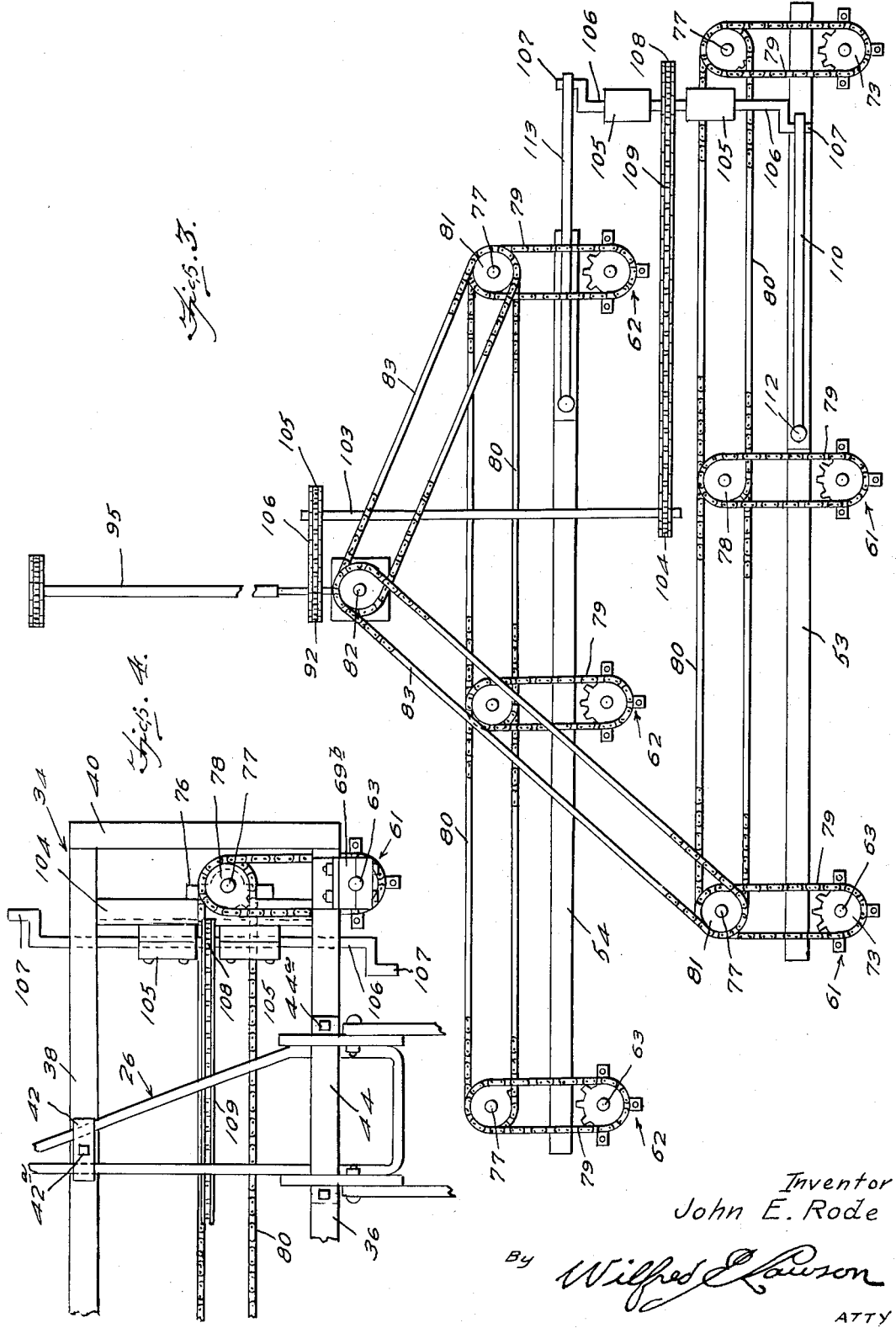

Nov. 1, 1955
J. E. RODE
2,722,167
PLANT THINNING APPARATUS
Filed Nov. 12, 1952
5 Sheets-Sheet 4
Fig. 5.
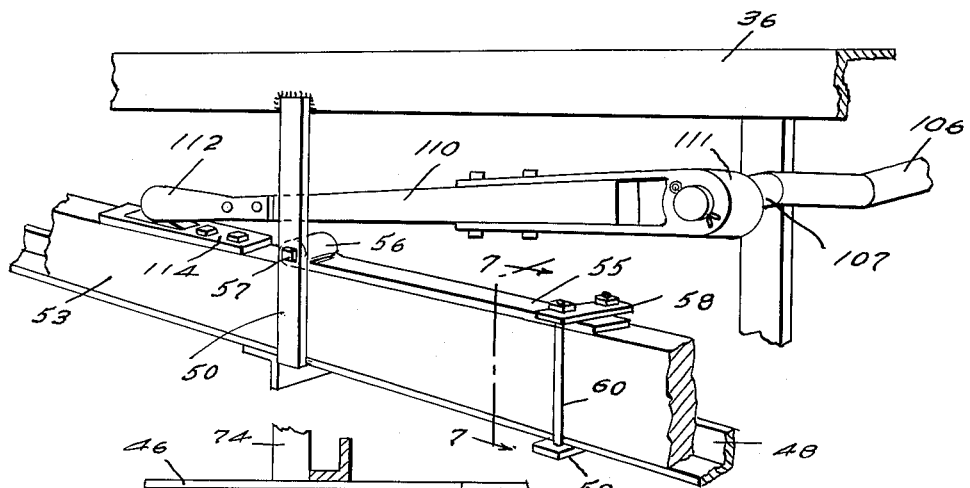
Fig. 6.
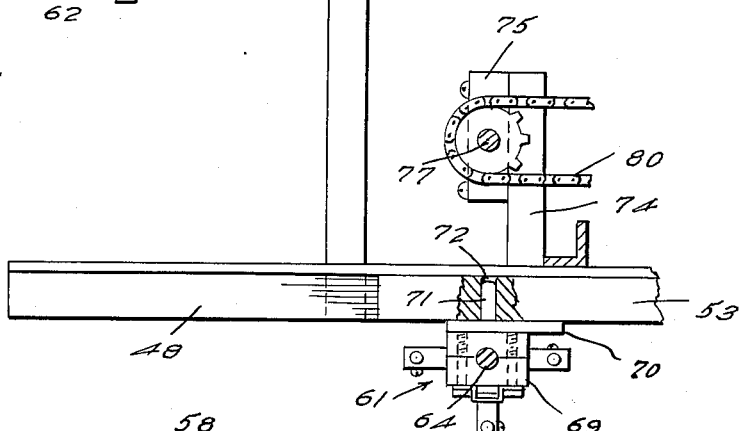
Fig. 7.
Inventor
John E. Rode
By Wilfred E. Lawson
ATTY Nov. 1, 1955 J. E. RODE 2,722,167
PLANT THINNING APPARATUS
Filed Nov. 12, 1952 5 Sheets-Sheet 5

Inventor
John E. Rode
By Wilfred E. Lawson
ATTY

United States Patent Office 2,722,167
Patented Nov. 1, 1955

2,722,167

PLANT THINNING APPARATUS

John E. Rode, Hillsboro, N. Dak.

Application November 12, 1952, Serial No. 320,033

2 Claims. (Cl. 97—12)

This invention relates generally to the class of agricultural machines and is directed particularly to an improved cultivating machine and plant thinner.

A particular object of the present invention is to provide a machine or apparatus which can be readily mounted upon a tractor structure, particularly a tractor structure having a lift mechanism, and operated from the power take-off of the tractor structure for uniformly taking out plants at predetermined intervals along a plant row for the thinning out of the same.

Another object of the invention is to provide an apparatus of the character stated wherein the constantly rotating fingers are caused to swing back and forth across a row as the machine advances along the row to engage with a twisting motion the plants to be removed and throw them out from the row.

Still another object of the invention is to provide an apparatus of the character stated which is assembled upon and carried by a single horizontal frame which is adapted to be disposed transversely of the underside of a tractor and secured thereto so that it may be operated from the tractor power take-off without having to make any alterations in the tractor structure.

A further and more specific object of the invention is to provide in a machine of the character stated, a novel arrangement of hanging rotatably supported cultivating units with means for turning such units from a suitable power take-off source, together with a novel means whereby such hanging rotating units may be swung back and forth across the path of travel of the machine, whereby to work across the rows of plants to remove the plants at predetermined intervals.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in front elevation of a tractor showing the present invention attached thereto and connected with the parts of a conventional lift mechanism.

Figure 2 is a view in side elevation of the structure.

Figure 3 is a view in top plan illustrating in a diagrammatic manner the arrangement of vertical jack shafts and the rotatable cultivator units together with the drive chain connections and the reciprocating cross bars for swinging the earth working units.

Figure 4 is a view in top plan of one end of the machine frame showing the connections with one frame of the elevator structure.

Figure 5 is a view in perspective of the drive connection between the crank shaft at one end thereof and the reciprocating beam.

Figure 6 is a horizontal section taken substantially on the line 6—6 of Figure 1.

Figure 7 is a sectional view taken substantially on the line 7—7 of Figure 5.

Figure 8:
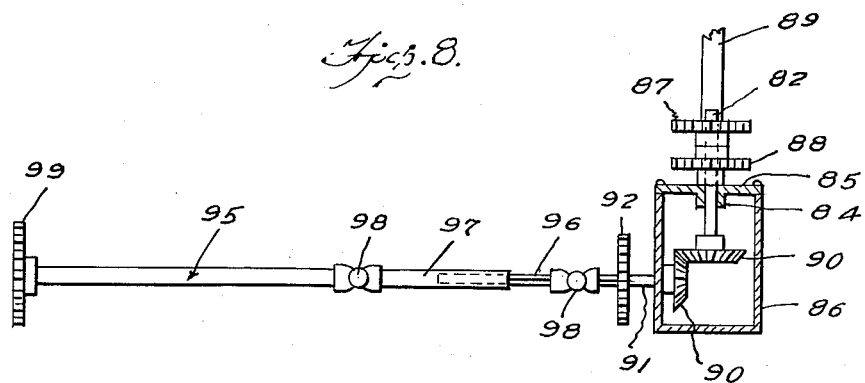
Figure 8 is a view illustrating partly in elevation and partly in section a portion of the power delivering mechanism between the tractor power take off and the reciprocating and rotating elements of the structure.

Referring now more particularly to the drawings the numeral 10 generally designates a tractor structure of any well-known or standard make wherein the chassis frame is designated 12, the front wheel is designated 14 and the rear wheels 16 are shown at the outer ends of the rear axle housing 18.

The mechanism of the present invention is so designed that it may be mounted in any one of several ways beneath the chassis frame of a carrying tractor which is equipped with a conventional power take-off such as that indicated at 20 which is located at the rear part of the transmission housing which is generally designated 22.

The tractor structure here illustrated is of a make which is provided upon each side with two laterally extending beams 24 which are designed for the carrying at each side of the tractor of cultivator mechanism. Such mechanism includes, at each side of the tractor and near the outer ends of the beams 24, a horizontally disposed, roughly triangular mounting frame which is generally designated 26 and which is hung from the lift arms and rods 28 and 30 respectively which are attached to the beams 24 as shown in Figure 2, and which have connected with them means 32 for swinging such rods and arms 28 and 30 to effect the raising and lowering of the frames 26. All of these parts are standard on a known type of tractor structure and form no part of the present invention, but are used for the mounting and support of the present invention in the manner about to be described. However, it is to be understood that while the cultivating mechanism of the present invention has been shown mounted upon the conventional lift mechanism of the character set forth, the present invention is not restricted to use in association with such lift mechanism but is so designed that it can be mounted to the underside of the chassis frame of any tractor structure.

In accordance with the present invention there is provided an elongate rectangular body frame which is generally designated 34 and which is disposed horizontally beneath the tractor chassis frame and is located at its outer ends beneath the lift frames 26.

The body frame 34 comprises the spaced parallel front and rear angle iron beams 36 and 38 and the end beams 40 connecting the beams 36 and 38 as shown in Figure 4.

The frame 34 is positioned against the undersides of the lift frames 26 and suitable means is employed for securing the two frames together as, for example, by the use of the clamping plates 42 and 44 which rest upon the top of the lift frames 26 and are secured to the underlying beams 36 and 38 by the connecting bolts 42a and 44a.

Disposed beneath the frame beams 36 and 38 are front and rear angle iron tracks 46 and 48 respectively, each of which is suspended from the overlying body frame beam by the hanger bars 50.

The angle iron tracks are also coupled one with the other by the transversely extending bracing and coupling bars 51.

As shown in Figure 1, the hanger bars 50 extend across the front sides of the L-shaped tracks 46 and 48 so that the lower portion of each bar 50 is spaced from the upstanding flange of the attached track bar.

In addition to the hanger bars 50 the bars 36 and 38 are coupled with the underlying bars 46 and 48 by hanger angle bars 52, the latter bars being connected with the rear faces of the upstanding flanges of the L-shaped track bars 46 and 48 as shown in Figure 2.

The reference characters 53 and 54 designate respectively front and rear slide bars which are supported respectively upon the horizontal flanges of the track bars 46 and 48 and are maintained in position by the adjacent hangers 50. These slide bars are designed to be reciprocated upon the respective track bars in the manner hereinafter stated.

As shown in Figure 1 the front slide bar 53 is positioned with the major portion thereof to one side of the longitudinal center of the machine, here shown as to the right side, while the rear side bar 54 is positioned with the major portion thereof to the left of the center.

In order to keep the slide bars 53 from rising up from the track each of the bars has disposed lengthwise thereover a hold down plate 55, one end of which is formed with a transverse eye 56 which is positioned adjacent to a hanger 50 and is secured in place by a bolt 57 which passes through the hanger 50, as shown in Figure 5, and through the eye 56.

Also holding down the plate 55 is a clamp means comprising upper and lower short plates 58 and 59 disposed respectively across the plate 55 and the underside of the track bar and connected together by the vertical coupling bolts 60.

Disposed vertically in front of the beam 36 and the underlying track bar 46 are a number of rotary units each of which is generally designated 61 and a number of similar units, each designated 62, are disposed in front of the rear beam 38 and the underlying track 48. These rotary units are staggered transversely of the machine so that the units 61 in the front move along paths which alternate with the paths followed by the units 62 in the rear.

Since the rotary units 61 and 62 are of identical form, the same reference characters will be employed for describing them.

Each of the units 61 and 62 comprises an upper shaft section 63 and a lower shaft section 64 and these shaft sections are coupled together by a universal joint coupling 65.

The lower end of the lower shaft section 64 carries a tool head 66 which includes a number of radial arms 67 to each of which is secured the upper end of an earth working pin 68.

Figure 10:
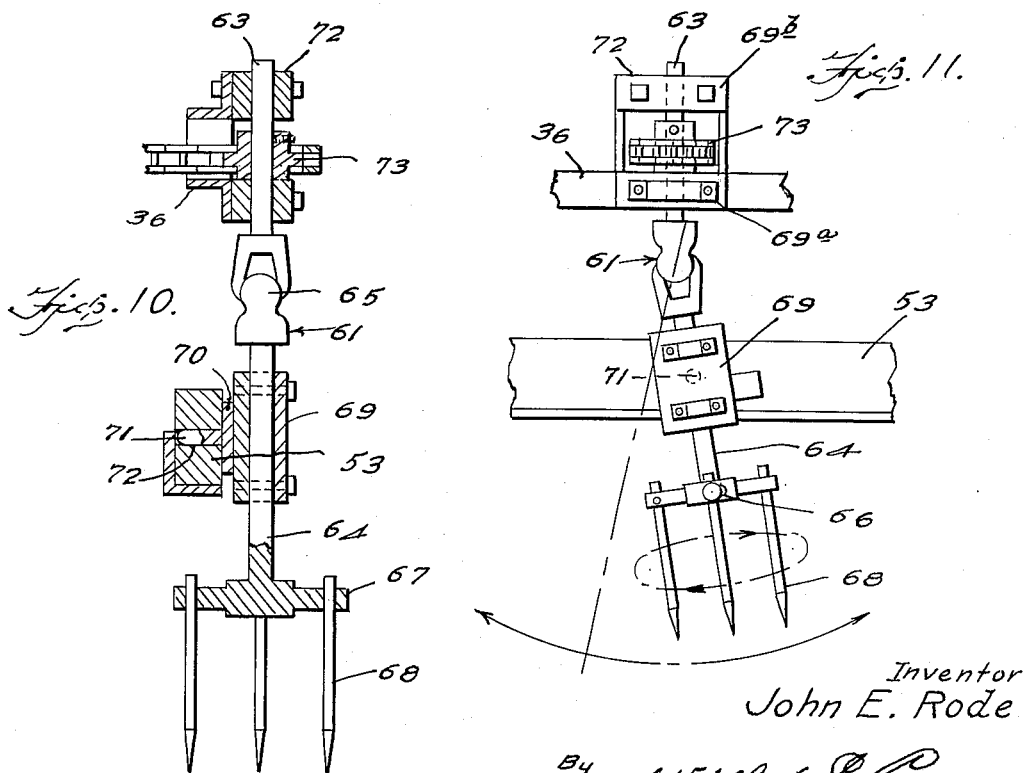
Figure 10 is a sectional view taken substantially on the line 10—10 of Figure 1.
Figure 11:
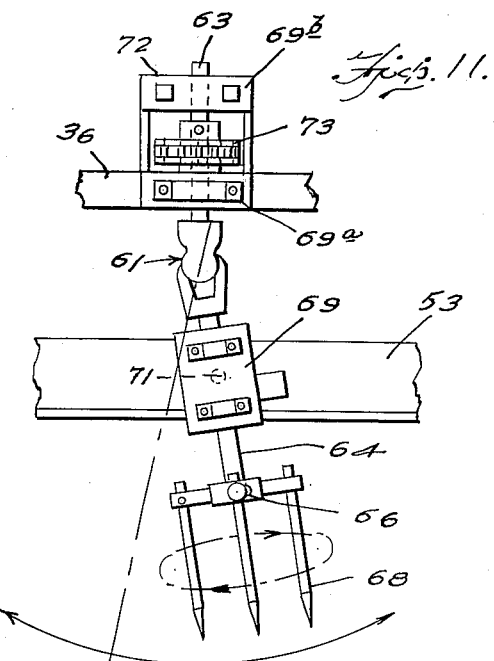
Figure 11 is a detailed view illustrating the motion of one of the earth working units and the driving parts connected therewith.

Each of the slide bars 53 and 54 has postioned adjacent to the front face thereof, a guide bearing 69 through which extends for both sliding and rotary movement a lower shaft section 64, as shown in Figures 10 and 11. Interposed between each guide bearing 69 and the adjacent slide bar, is a plate 70 which is fixed to the bearing 69 and which carries a pivot pin 71 which is positioned in an aperture 72 in the slide bar, whereby rocking movement of the bearing 69 is permitted as the slide bar reciprocates.

Each of the upper shaft sections 63 extends through a guide bearing 69a and such guide bearing is secured to the forward face of the adjacent frame beam 46 or 48 and the shaft section is free for rotation and longitudinal movement in the bearing 69a.

Overlying each of the upper guide bearings 69a and spaced therefrom is a second upper guide bearing which is designated 69b and through which the upper end of the upper shaft section 63 passes as shown in Figures 10 and 11. These upper guide bearings are supported in any suitable manner, as illustrated, upon the adjacent frame beam.

Between the upper guide bearings 69a and 69b each upper shaft section 63 has secured thereto a sprocket gear 73, for the purpose hereinafter set forth.

Upon the rear side of each of the slide bar track bars 46 and 48 there is secured adjacent to a rotary unit 61 or 62 a short rearwardly extending bearing supporting bar 74 to one side of which is secured a bearing 75.

Above each of the bearings 75 is mounted upon the frame 34 an upper bearing 76.

Supported upon each pair of upper and lower bearings 75 and 76 is a vertical jack shaft 77, each of which carries a sprocket gear 78 which is in driving connection with the adjacent rotary unit gear 73 by means of a sprocket chain 79.

The jack shafts 77 forming the front group are operatively connected together by chains 80 to be driven in unison and corresponding chains 80 connect together jack shafts 77 of the back group as shown in Figure 3, and in addition, one of the end jack shafts 77 of each group carries a power receiving sprocket gear 81 by which driving power is transmitted from the vertical intermediate power shaft 82 by means of chains 83.

The intermediate power shaft 82 is mounted in and extends through a bearing 84 in the top 85 of a gear box 86. The shaft 82 carries the two sprocket gears 87 and 88 with which the chains 83 are connected. This gear box 86 is supported in a suitable manner, as for example, by the use of suitable supporting or bracket arms 89 which may be secured to the transmission housing or some other part of the tractor in the location illustrated in Figure 2, so that a convenient connection can be made between the gears in the box 86 and the power take off 20 of the tractor as shown.

The gear box houses the two miter gears 90 one of which is secured to the lower end of the shaft 82, while the other one is carried by a stub shaft 91 which extends horizontally through the rear side of the gear box as shown in Figure 8. This stub shaft 91 carries a sprocket gear 92 for the purpose hereinafter described.

While power may be transmitted from the take-off 20 to the stub shaft 91 in any suitable manner, the means here disclosed comprises a mounting plate 93 secured to the under side of the transmission housing 22, to which plate are secured two bearings 94 which support an articulated power transmitting shaft which is generally designated by the reference character 95. This articulated shaft 95 includes a squared portion 96 and a tubular rear end portion 97 which receives the forward end of the squared portion to allow for lengthwise play and universal couplings 98 are also included in the shaft to allow for relative transverse movement between the housing and the forward end of the shaft which carries a gear wheel 99 which is connected by the sprocket chain 100 with a gear wheel 101 carried by the power take-off shaft 20.

As shown in Figure 8 the rear end portion, comprising the squared portion 96 of the articulated shaft, is connected with the stub shaft 92.

For the driving of the slide bars the following mechanism is employed.

Suitable hanger bearings 102, Figure 1, are mounted on the frame 34, on the front and rear beams thereof, which support a countershaft 103 which extends longitudinally of the machine in offset parallel relation with the articulated shaft 95 as shown in Figure 3. This countershaft carries upon the forward and rear ends the sprocket gears 104 and 105 respectively and the gear 105 is connected by the drive chain 106 with the sprocket gear 92.

At one end of the body frame 34 there are mounted upon a suitable supporting beam 104 which extends between the beams 38 and 44, as shown in Figure 4, a pair of aligned bearings 105 which support a crank shaft 106. This shaft extends in the longitudinal direction of the machine and carries upon each end a crank 107.

The bearings 105 are spaced apart as shown and between these bearings the shaft 106 has mounted thereon the sprocket gear 108. This gear 108 is in driving connection with the gear 104 by the sprocket chain 109 as is shown most clearly in the diagrammatic view forming Figure 3. Thus rotary power is transmitted to the shaft 106 from the articulated shaft 95 and through the countershaft 103.

The front crank 107 has connected therewith a pitman 110 which carries at one end suitable bearing 111 in which the crank is engaged and at its other end is a socket member 112.

The rear crank member 107 also has connected therewith a pitman which is designated 113 and which is constructed in the same manner as the pitman 110 which is shown in detail in Figure 5.

Figure 9:
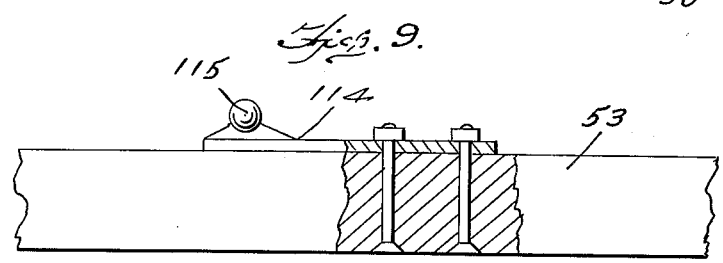
Figure 9 is a sectional detail showing the connection of the pitman head with a reciprocating beam.

Each of the tool carrying slide bars 53 and 54 has secured to the top thereof a coupling plate 114 which carries the upstanding ball 115 as shown in Figure 9. This ball on the front slide bar 53 has the pitman socket secured thereover and on the rear slide bar the corresponding socket for the rear pitman 113 is secured over the coupling ball which that slide bar carries.

While it is believed that the operation of the present invention will be clear from the foregoing description a short statement of such operation will nevertheless be given, as follows.

The machine as illustrated in Figure 1 is provided with six rotary units divided in two groups of three each and these are spaced transversely of the path of travel of the machine. The machine thus illustrated can be worked over six rows of plants at one time, each of the rotary units moving along a plant row as will be apparent.

In the forward movement of the machine the rotary power transmitted from the power take off through the intermediate power shaft 82 and the countershaft 103 to the jack shafts and to the crank shafts 106 will effect the simultaneous rotation of units 61 and 62 and the swinging movement of the lower shaft sections of these units together with the pin members 68. Thus the pin members will be spun or rotated constantly and at the same time, by reason of the back and forth movement of the slide bars 53 and 54 it will be swung across the plant row so as to tear out the plants from the rows at spaced intervals.

The swinging movement of the spinning picker pins 68 can be increased or decreased as desired by changing the sprocket gears 92 and 105 together with the chain 106 so as to vary the spacing of the plants which are left standing.

By reason of the fact that the present structure is mounted upon a standard lift mechanism it will be seen that the earth working elements can be raised from the ground or lowered into working position as desired.

While the present machine has been described as a plant thinning machine, it may also be employed as a cultivator. In such use the pins 68 may be removed and replaced by other suitable tines such as the tines of spring metal or spring steel.

In addition to changing the earth working members as above set forth the chains 83 may be taken off and suitable means employed for securing the other chains against movement, after which power will be transmitted from the shaft 95 only to the shaft 103 and then to the crank shaft 106 to effect the reciprocation of the beams 53 and 54. In this manner the cultivating spring tines would merely be swung back and forth to cultivate the earth, without being rotated.

I claim:

1. In a plane thinning attachment for farm tractors and the like, including a power takeoff, a frame supported on the tractor transversely of the path of travel of the tractor, a pair of angled track bars supported horizontally in spaced parallel relation lengthwise on said frame, a slide bar supported on each track bar, bearing members supported in spaced relation alongside of each slide bar, earth working elements dependingly supported from said bearing members, a pivot pin projecting laterally from each bearing member and engaged in the near side of an adjacent slide bar, means operatively connected with said power takeoff for imparting rotary motion to said earth working elements, and other means operatively connected commonly with the first means to said power takeoff for imparting reciprocatory motion to said slide bars which motion effects a swinging motion to the earth working elements through the pivot connections between the slide bars and said bearing members.

2. The attachment as defined in claim 1, with the said other means comprising a shaft mounted horizontally beyond one of the ends of said slide bars and crosswise with respect thereto, a crank on each end of said shaft, a pitman extending from each crank and operatively connected to a respective slide bar, said cranks being reversed, one with respect to the other, so as to effect movements of said slide bars alternately in opposite directions.

References Cited in the file of this patent

UNITED STATES PATENTS

| 1,089,351 | Thompson | Mar. 3, 1914 |
| 1,515,012 | Davis | Nov. 11, 1924 |
| 2,563,326 | Ferguson | Aug. 7, 1951 |
| 2,592,097 | Younger | Apr. 8, 1952 |

FOREIGN PATENTS

| 41,523 | Denmark | Jan. 14, 1930 |
| 58,550 | Denmark | Mar. 31, 1941 |